United States Patent
Nazarpoor (10) Patent No.: US 9,259,716 B2
(45) Date of Patent: Feb. 16, 2016

(54) OXIDATION CATALYST SYSTEMS COMPOSITIONS AND METHODS THEREOF

(71) Applicant: Zahra Nazarpoor, Camarillo, CA (US)

(72) Inventor: Zahra Nazarpoor, Camarillo, CA (US)

(73) Assignee: CLEAN DIESEL TECHNOLOGIES, INC., Oxnard, CA (US)

( * ) Notice: Subject to any disclaimer, the term of this patent is extended or adjusted under 35 U.S.C. 154(b) by 189 days.

(21) Appl. No.: 13/849,230

(22) Filed: Mar. 22, 2013

(65) Prior Publication Data

US 2014/0274675 A1 Sep. 18, 2014

Related U.S. Application Data

(60) Provisional application No. 61/791,838, filed on Mar. 15, 2013.

(51) Int. Cl.
*B01J 23/10* (2006.01)
*B01J 23/89* (2006.01)
(Continued)

(52) U.S. Cl.
CPC ............... *B01J 23/894* (2013.01); *B01J 23/83* (2013.01); *B01J 37/0244* (2013.01);
(Continued)

(58) Field of Classification Search
CPC ........... B01J 23/894; B01J 23/83; B01J 23/66
USPC ................................. 502/303, 304
See application file for complete search history.

(56) References Cited

U.S. PATENT DOCUMENTS 3,284,370 A 11/1966 Alan et al.
4,062,810 A 12/1977 Vogt et al.
(Continued)

FOREIGN PATENT DOCUMENTS

CH 644637 A5 8/1984
CN 102172527 9/2011
(Continued)

OTHER PUBLICATIONS

K. S. Abdel Halim et al. "Catalytic Oxidation of CO Gas over Nanocrystallite $CuxMn1-xFe2O4$", Feb. 26, 2008, Top Catalyst (2008) 47:66-72.

(Continued)

*Primary Examiner* — Colleen Dunn
*Assistant Examiner* — Haytham Soliman
(74) *Attorney, Agent, or Firm* — Barnes & Thornburg LLP; Thomas J. McWilliams; Edward F. Behm, Jr.

(57) ABSTRACT

Compositions and methods for the preparation of ZPGM oxidation catalyst systems are disclosed. ZPGM catalyst systems may be employed within catalytic converters under lean hydrocarbon, air to fuel ratio condition to oxidize toxic gases, such as carbon monoxide and other hydrocarbons that may be included in exhaust gas. ZPGM oxidation catalyst systems are completely free of PGM catalyst and may include: a substrate, a washcoat, and an overcoat. Washcoat may include silver as ZPGM catalyst, and carrier material oxides. Similarly, overcoat may include at least one ZPGM catalyst, carrier material oxides and OSMs. Overcoat of the disclosed ZPGM catalyst system may include copper and cerium as ZPGM catalysts. Suitable known in the art chemical techniques, deposition methods and treatment systems may be employed in order to form the disclosed ZPGM catalyst systems. ZPGM catalyst systems may include high surface area, low conversion temperature catalysts that may exhibit high efficiency in the conversion of exhaust gases.

23 Claims, 8 Drawing Sheets

(51) Int. Cl.
  *B01J 23/83* (2006.01)
  *B01J 37/02* (2006.01)
  *B01J 23/66* (2006.01)
  *B01J 37/00* (2006.01)
  *B01D 53/94* (2006.01)

(52) U.S. Cl.
  CPC ...... *B01D 53/945* (2013.01); *B01D 2255/2061* (2013.01); *B01D 2255/2063* (2013.01); *B01D 2255/2065* (2013.01); *B01D 2255/2092* (2013.01); *B01D 2255/20761* (2013.01); *B01D 2255/908* (2013.01); *B01J 23/66* (2013.01); *B01J 37/0036* (2013.01); *B01J 2523/00* (2013.01)

(56) References Cited

U.S. PATENT DOCUMENTS

| | | |
|---|---|---|
| 4,274,981 A | 6/1981 | Suzuki et al. |
| 4,297,150 A | 10/1981 | Sims et al. |
| 4,414,023 A | 11/1983 | Aggen et al. |
| 4,661,329 A | 4/1987 | Suzuki et al. |
| 4,673,556 A | 6/1987 | McCabe et al. |
| 4,797,329 A | 1/1989 | Kilbane et al. |
| 4,885,269 A | 12/1989 | Cyron |
| 5,063,193 A | 11/1991 | Bedford et al. |
| 5,162,284 A | 11/1992 | Soled et al. |
| 5,238,898 A | 8/1993 | Han et al. |
| 5,364,517 A | 11/1994 | Dieckmann et al. |
| 5,371,056 A | 12/1994 | Leyrer et al. |
| 5,580,553 A | 12/1996 | Nakajima |
| 5,658,543 A | 8/1997 | Yoshida et al. |
| 5,747,410 A | 5/1998 | Muramatsu et al. |
| 6,129,834 A | 10/2000 | Peters et al. |
| 6,395,244 B1 | 5/2002 | Hartweg et al. |
| 6,576,587 B2 | 6/2003 | Labarge et al. |
| 6,624,113 B2 | 9/2003 | Labarge et al. |
| 6,696,389 B1 | 2/2004 | Boegner et al. |
| 6,747,180 B2 | 6/2004 | Ostgard et al. |
| 6,774,080 B2 | 8/2004 | LaBarge et al. |
| 6,938,411 B2 | 9/2005 | Hoffmann et al. |
| 7,129,194 B2 | 10/2006 | Baca et al. |
| 7,393,809 B2 | 7/2008 | Kim |
| 7,485,273 B2 | 2/2009 | Gandhi et al. |
| 7,563,744 B2 | 7/2009 | Klein et al. |
| 7,576,029 B2 | 8/2009 | Saito et al. |
| 7,641,875 B1 | 1/2010 | Golden |
| 7,749,472 B2 | 7/2010 | Chen et al. |
| 7,772,147 B2 | 8/2010 | Collier et al. |
| 7,803,338 B2 | 9/2010 | Socha et al. |
| 7,875,573 B2 | 1/2011 | Beutel et al. |
| 7,943,104 B2 | 5/2011 | Kozlov et al. |
| 8,080,494 B2 | 12/2011 | Yasuda et al. |
| 8,148,295 B2 | 4/2012 | Augustine |
| 8,158,551 B2 | 4/2012 | Verdier et al. |
| 8,168,125 B2 | 5/2012 | Choi |
| 8,242,045 B2 | 8/2012 | Kulkarni et al. |
| 8,318,629 B2 | 11/2012 | Alive et al. |
| 8,845,987 B1 | 9/2014 | Nazarpoor et al. |
| 8,853,121 B1 | 10/2014 | Nazarpoor et al. |
| 8,858,903 B2 | 10/2014 | Nazarpoor |
| 8,969,228 B2 | 3/2015 | Nazarpoor et al. |
| 2002/0042341 A1 | 4/2002 | Golden |
| 2003/0092566 A1 | 5/2003 | Inoue et al. |
| 2004/0151647 A1 | 8/2004 | Wanninger et al. |
| 2006/0120936 A1 | 6/2006 | Alive et al. |
| 2006/0292342 A1 | 12/2006 | Ohno et al. |
| 2008/0125308 A1 | 5/2008 | Fujdala et al. |
| 2009/0220697 A1 | 9/2009 | Addiego |
| 2009/0274903 A1 | 11/2009 | Addiego |
| 2009/0324468 A1 | 12/2009 | Golden et al. |
| 2009/0324469 A1 | 12/2009 | Golden et al. |
| 2009/0324470 A1 | 12/2009 | Alamdari et al. |
| 2010/0062293 A1 | 3/2010 | Triantafyllopoulous et al. |
| 2010/0081563 A1 | 4/2010 | Edgar-Beltran et al. |
| 2010/0152032 A1 | 6/2010 | Galligan |
| 2010/0168449 A1 | 7/2010 | Grey et al. |
| 2010/0184590 A1 | 7/2010 | Althofer et al. |
| 2010/0240525 A1 | 9/2010 | Golden et al. |
| 2010/0266473 A1 | 10/2010 | Chen et al. |
| 2010/0293929 A1 | 11/2010 | Zhan et al. |
| 2012/0015801 A1 | 1/2012 | Deprez et al. |
| 2013/0115144 A1 | 5/2013 | Golden et al. |
| 2013/0172177 A1 | 7/2013 | Domke et al. |
| 2013/0323145 A1 | 12/2013 | Tran et al. |
| 2014/0271384 A1 | 9/2014 | Nazarpoor et al. |
| 2014/0271387 A1 | 9/2014 | Nazarpoor |
| 2014/0271388 A1 | 9/2014 | Nazarpoor et al. |
| 2014/0271390 A1 | 9/2014 | Nazarpoor |
| 2014/0271391 A1 | 9/2014 | Nazarpoor |
| 2014/0271392 A1 | 9/2014 | Nazarpoor |
| 2014/0271393 A1 | 9/2014 | Nazarpoor |
| 2014/0274662 A1 | 9/2014 | Nazarpoor |
| 2014/0274674 A1 | 9/2014 | Nazarpoor et al. |
| 2014/0274675 A1 | 9/2014 | Nazarpoor |
| 2014/0274677 A1 | 9/2014 | Nazarpoor |
| 2014/0274678 A1 | 9/2014 | Nazarpoor |
| 2014/0301909 A1 | 10/2014 | Nazarpoor |
| 2014/0301931 A1 | 10/2014 | Nazarpoor |
| 2014/0302983 A1 | 10/2014 | Nazarpoor |
| 2014/0334989 A1 | 11/2014 | Nazarpoor et al. |
| 2014/0334990 A1 | 11/2014 | Nazarpoor |
| 2014/0336038 A1 | 11/2014 | Nazarpoor et al. |
| 2014/0336044 A1 | 11/2014 | Nazarpoor et al. |
| 2014/0336045 A1 | 11/2014 | Nazarpoor et al. |
| 2014/0356243 A1 | 12/2014 | Nazarpoor |
| 2014/0357475 A1 | 12/2014 | Nazarpoor et al. |
| 2014/0357479 A1 | 12/2014 | Nazarpoor et al. |
| 2015/0005157 A1 | 1/2015 | Nazarpoor et al. |
| 2015/0005158 A1 | 1/2015 | Nazarpoor et al. |
| 2015/0018202 A1 | 1/2015 | Nazarpoor et al. |
| 2015/0018203 A1 | 1/2015 | Nazarpoor et al. |
| 2015/0018204 A1 | 1/2015 | Nazarpoor et al. |
| 2015/0018205 A1 | 1/2015 | Nazarpoor et al. |
| 2015/0051067 A1 | 2/2015 | Nazarpoor et al. |
| 2015/0105242 A1 | 4/2015 | Nazarpoor et al. |
| 2015/0105243 A1 | 4/2015 | Nazarpoor et al. |
| 2015/0105245 A1 | 4/2015 | Nazarpoor et al. |
| 2015/0105246 A1 | 4/2015 | Nazarpoor et al. |
| 2015/0105247 A1 | 4/2015 | Nazarpoor et al. |
| 2015/0147239 A1 | 5/2015 | Launois et al. |
| 2015/0147251 A1 | 5/2015 | Nazarpoor et al. |
| 2015/0148215 A1 | 5/2015 | Nazarpoor |
| 2015/0148216 A1 | 5/2015 | Nazarpoor et al. |
| 2015/0148220 A1 | 5/2015 | Nazarpoor |
| 2015/0148222 A1 | 5/2015 | Nazarpoor |
| 2015/0148223 A1 | 5/2015 | Nazarpoor et al. |
| 2015/0148224 A1 | 5/2015 | Nazarpoor et al. |
| 2015/0148225 A1 | 5/2015 | Nazarpoor et al. |

FOREIGN PATENT DOCUMENTS

| | | |
|---|---|---|
| EP | 0022349 | 1/1981 |
| EP | 0450987 | 10/1991 |
| EP | 0605142 | 7/1994 |
| EP | 1 256 382 | 11/2002 |
| JP | 62-20613 | 1/1987 |
| JP | 4-215853 | 8/1992 |
| WO | WO 2013004814 | 1/2013 |
| WO | WO 2013068243 | 5/2013 |
| WO | WO 2013121112 | 8/2013 |
| WO | WO 2013153081 | 10/2013 |

OTHER PUBLICATIONS

D. Panayotov, "Interaction Between NO, CO and O2 on gamma-AL2O3-Supported Copper—Manganese Oxides", 1996, React. Kinet.Catal.Lett. vol. 58, No. 1, 73-78.

Tanaka et al., "Influence of preparation method and additive for Cu—Mn spinel oxide catalyst on water gas shift reaction of reformed fuels", Applied Catalysis A: General 279 (2005) 59-66.

Papavasilious et al., "Combined Steam reforming of methanol over Cu—Mn spinel oxide catalysts", Journal of Catalysis 251 (2007) 7-20.

(56) References Cited

OTHER PUBLICATIONS

Mestres et al., Phase Diagram at Low Temperature of the System Zr02/Nb205, Z.Znorg. Alig. Chem., 2001, 627, 294-298.

Non-Final Office Action for U.S. Appl. No. 13/849,169 issued Mar. 6, 2014.

Hayes et al., "Introduction to Catalytic Combustion", pp. 310-313, 1997 OPA (Overseas Publishers Association).

OXIDATION CATALYST SYSTEMS COMPOSITIONS AND METHODS THEREOF

CROSS-REFERENCE TO RELATED APPLICATIONS

The present application claims priority to U.S. Provisional Patent Application No. 61/791,838, filed Mar. 15, 2013, entitled Oxidation Catalyst Systems Compositions and Methods Thereof, and is related to U.S. patent application Ser. No. 12/229,792, entitled Zero Platinum Group Metal Catalysts, filed Aug. 26, 2008, and U.S. patent application Ser. No. 12/791,699, entitled Zero Platinum Group Metal Catalysts, filed Jun. 1, 2010, the entireties of which are incorporated herein by reference.

BACKGROUND

1. Field of the Disclosure

The present disclosure relates generally to catalytic systems, and more particularly to compositions and methods for the preparation of Zero Platinum Group Metal (ZPGM) oxidation catalyst systems.

2. Background

Catalysts within catalytic converters may work by oxidizing carbon monoxide (hereinafter referred to as "CO") to less harmful carbon dioxide, and oxidizing unburnt hydrocarbons (hereinafter referred to as "HC") to carbon dioxide and water. Catalytic converters may also reduce nitrogen oxides ($NO_x$) into nitrogen and oxygen.

Catalysts within catalytic converters are generally fabricated using at least some platinum group metals (PGM). With the ever stricter standards for acceptable emissions, the demand on PGM continues to increase due to their efficiency in removing pollutants from exhaust. However, this demand, along with other demands for PGM, places a strain on the supply of PGM, which in turn drives up the cost of PGM and therefore catalysts and catalytic converters.

For the foregoing reasons, there is a need for improved catalyst systems that do not require PGM, that may work at low conversion temperatures and may exhibit similar or better efficiency than prior art oxidation catalysts.

SUMMARY

The present disclosure includes compositions and methods for the preparation of Zero Platinum Group Metal (ZPGM) catalyst systems that may be employed to oxidize carbon monoxide and hydrocarbons included in exhaust gas. The disclosed catalysts are completely free of PGM, as such; they are referred to as ZPGM catalysts. In one embodiment ZPGM catalysts may form low conversion temperature ZPGM catalyst systems. ZPGM catalysts in the form of aqueous slurry, as a coating, may be deposited on suitable substrates in order to fabricate ZPGM catalyst systems that may be employed within catalytic converters which may be used to convert toxic exhaust gases such as CO to less harmful carbon dioxide, and oxidizing unburnt HC's to carbon dioxide and water.

The disclosed ZPGM catalyst systems may include at least three layers of materials: a substrate, a washcoat, and an overcoat. Substrates may be in the form of beads or pellets or any suitable form. Furthermore, substrates may be produced from a refractive material, a ceramic substrate, a honeycomb structure, a metallic substrate, a ceramic foam, a metallic foam, a reticulated foam, or any suitable combination.

In the present disclosure, washcoats generally include at least one ZPGM transition metal catalyst, such as silver (Ag), and carrier material oxides, such as $Al_2O_3$. Moreover, according to an embodiment of the present disclosure, overcoat may include not only ZPGM transition metal catalysts such as copper, rare earth metals such as cerium, and carrier material oxides, but also oxygen storage materials (OSM's). Alternative embodiments may include $CeO_2$, $ZrO_2$, and $TiO_2$, among others, as carrier material oxides. Furthermore, other embodiments of the present disclosure may include other materials.

To prepare washcoat and overcoat, an aqueous slurry is produced which may be used as coatings to fabricate the disclosed ZPGM catalysts systems, a co-milling method may be employed. In the present disclosure, the ZPGM catalysts already form part of the washcoat slurry and overcoat slurry, as such; both washcoat or overcoat materials and ZPGM catalysts may be deposited on a substrate in a single step.

In other embodiments, ZPGM catalysts may be impregnated onto the washcoat layer. Similarly ZPGM catalysts may also be impregnated onto the overcoat layer. In some embodiments, washcoat catalysts and overcoat catalysts may be synthesized by any suitable chemical technique such as co-precipitation or any other suitable technique known in the art. The aqueous slurry including washcoat catalysts may be deposited on a suitable substrate in order to form a washcoat.

In one embodiment, vacuum dosing and coating systems may be employed to deposit washcoat slurry on a substrate as well as overcoat slurry on a washcoat. Moreover, other deposition methods may be employed to deposit the catalysts aqueous slurry.

In one embodiment, the washcoat may be treated with heat before an overcoat is deposited on the washcoat. In other embodiments an overcoat may be deposited on the washcoat before the washcoat is treated and subsequently both washcoat and overcoat may be simultaneously treated with heat. In one embodiment, treatment may be achieved by employing firing systems. Other embodiments may employ other suitable treatment systems.

The disclosed ZPGM catalyst systems may be employed as oxidation ZPGM catalyst systems within catalytic converters. ZPGM catalyst systems of the present disclosure may include high surface area, low conversion temperature catalysts that may convert toxic exhaust gas into less harmful compounds.

BRIEF DESCRIPTION OF THE DRAWINGS

Embodiments of the present disclosure are described by way of example with reference to the accompanying figures, which are schematic and are not intended to be drawn to scale.

DETAILED DESCRIPTION

The present disclosure is hereby described in detail with reference to embodiments illustrated in the drawings, which form a part hereof. Other embodiments may be used and/or and other changes may be made without departing from the spirit or scope of the present disclosure. The illustrative embodiments described in the detailed description are not meant to be limiting of the subject matter presented herein.
Definitions As used herein, the following terms have the following definitions:

"Catalyst system" refers to a system of at least two layers including at least one substrate, a washcoat, and/or an overcoat.

"Substrate" refers to any suitable material for supporting a catalyst and can be of any shape or configuration that yields a sufficient surface area for the deposition of a washcoat.

"Washcoat" refers to at least one coating including at least one oxide solid that may be deposited on a substrate.

"Overcoat" refers to at least one coating including one or more oxide solids that may be deposited on at least one washcoat.

"Oxide solid" refers to any mixture of materials selected from the group including a carrier material oxide, a catalyst, and a mixture thereof.

"Carrier material oxide" refers to materials used for providing a surface for at least one catalyst.

"Oxygen storage material" refers to materials that can take up oxygen from oxygen-rich feed streams and release oxygen to oxygen-deficient feed streams.

"ZPGM Transition Metal Catalyst" refers to at least one catalyst that includes at least one transition metal that is completely free of platinum group metals.

"Impregnation component" refers to at least one component added to a washcoat and/or overcoat to yield a washcoat and/or overcoat including at least one catalyst.

"Platinum group metals" refers to platinum, palladium, ruthenium, iridium, osmium, and rhodium.

"Treating," "treated," or "treatment" refers to drying, firing, heating, evaporating, calcining, or mixtures thereof.

"Exhaust" refers to the discharge of gases, vapor, and fumes created by and released at the end of a process, including hydrocarbons, nitrogen oxide, and/or carbon monoxide.

"R Value" refers to the number obtained by dividing the reducing potential by the oxidizing potential.

"Rich Exhaust" refers to exhaust with an R value above 1.

"Lean Exhaust" refers to exhaust with an R value below 1.
Description of Drawings Compositions and methods for preparation of low conversion temperature, ZPGM oxidation catalyst systems are disclosed. Disclosed oxidation ZPGM catalyst systems may include at least one ZPGM catalyst.

ZPGM Catalyst System Configuration and Composition

Figure 1:
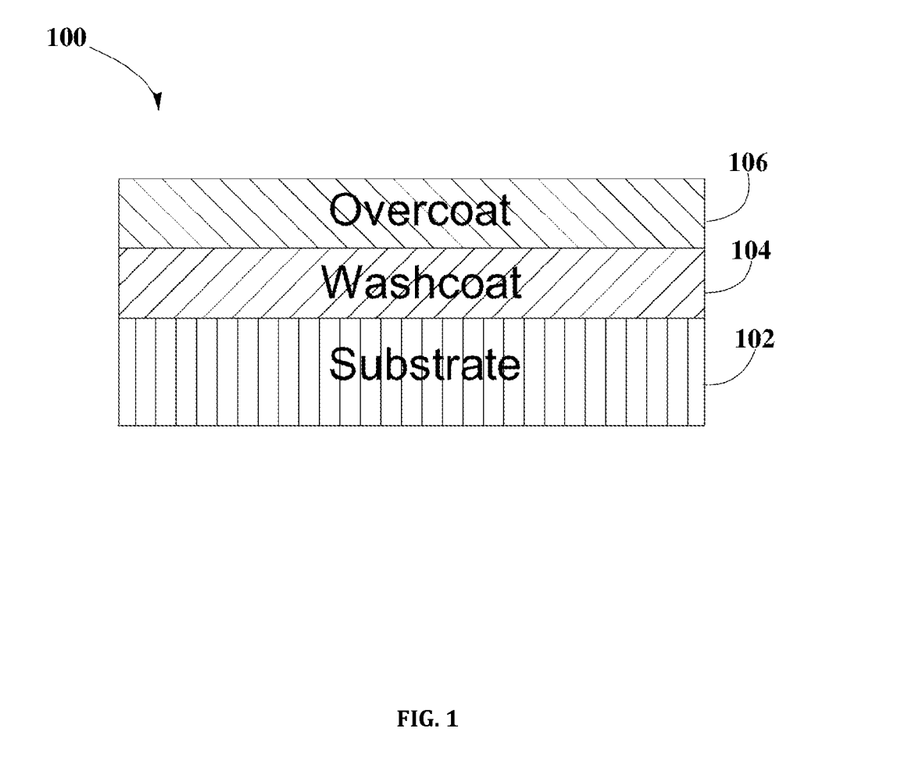
FIG. 1 is a ZPGM catalyst system configuration, according to an embodiment.

FIG. 1 depicts ZPGM Catalyst System 100 configuration of the present disclosure. As shown in FIG. 1, ZPGM Catalyst System 100 may include at least a Substrate 102, a Washcoat 104, and an Overcoat 106, wherein Washcoat 104 and Overcoat 106 may include at least one ZPGM catalyst.

Substrate Materials

In an embodiment of the present disclosure, Substrate 102 materials may include a refractive material, a ceramic material, a honeycomb structure, a metallic material, a ceramic foam, a metallic foam, a reticulated foam, or suitable combinations, where Substrate 102 may have a plurality of channels with suitable porosity. Porosity may vary according to the particular properties of Substrate 102 materials. Additionally, the number of channels may vary depending upon Substrate 102 used as is known in the art. The type and shape of a suitable Substrate 102 would be apparent to one of ordinary skill in the art.

In one embodiment, Substrate 102 may be in the form of beads or pellets or of any suitable form. The beads or pellets may be formed from any suitable material such as alumina, silica alumina, silica, titania, mixtures thereof, or any suitable material. In some embodiments a ceramic honeycomb Substrate 102 may be used, which may be formed from any suitable material such as sillimanite, zirconia, petalite, spodumene (lithium aluminum silicate), magnesium silicates, mullite, alumina, cordierite (e.g. $Mg_2 A_{14} Si_5 O_{18}$), other alumino-silicate materials, silicon carbide, aluminum nitride, or combinations thereof. Other ceramic substrates 102 would be apparent to one of ordinary skill in the art.

If Substrate 102 is a metal honeycomb Substrate 102, the metal may be a heat-resistant base metal alloy, particularly an alloy in which iron is a substantial or major component. The surface of the metal Substrate 102 may be oxidized at elevated temperatures above about 1000° C. to improve the corrosion resistance of the alloy by forming an oxide layer on the surface of the alloy. The oxide layer on the surface of the alloy may also enhance the adherence of a Washcoat 104 to the surface of a monolith Substrate 102.

In some embodiments, Substrate 102 may be a monolithic carrier having a plurality of fine, parallel flow passages extending through the monolith. The passages can be of any suitable cross-sectional shape and/or size. The passages may be, for example trapezoidal, rectangular, square, sinusoidal, hexagonal, oval, or circular, although other shapes are also suitable. The monolith may contain from about 9 to about 1200 or more gas inlet openings or passages per square inch of cross section, although fewer passages may be used.

Washcoat Composition

According to an embodiment of the present disclosure, Washcoat 104 may include at least one ZPGM transition metal catalyst. A ZPGM transition metal catalyst may include one or more transition metals that are completely free of platinum group metals. ZPGM transition metal catalyst may include scandium, titanium, chromium, manganese, iron, cobalt, nickel, copper, zinc, yttrium, zirconium, niobium, molybdenum, silver, cadmium, hafnium, tantalum, tungsten, rhenium and gallium. Preferably the transition metal is silver and copper. Most suitable ZPGM transition metal may be silver. The total amount of silver may be of about 1% by weight to about 20% by weight of the total catalyst weight, preferred being of about 4% to 10% by weight.

In other embodiments, additional ZPGM transition metals may be included in Washcoat 104 composition.

Additionally, Washcoat 104 may include support oxides material referred to as carrier material oxides. Carrier material oxides may include aluminum oxide, doped aluminum oxide, spinel, delafossite, lyonsite, garnet, perovksite, pyrochlore, doped ceria, fluorite, zirconium oxide, doped zirconia, titanium oxide, tin oxide, silicon dioxide, zeolite, and mixtures thereof. Most suitable carrier material oxide for the disclosed Washcoat 104 may be pure alumina ($Al_2O_3$). Alumina free of lanthanum doping is a most suitable carrier material oxide because it has been found that the presence of lanthanum may decrease the activity of the silver within Washcoat 104. Other embodiments may include alumina mixed with other metals. Carrier material oxide may be present in Washcoat 104 in a ratio of about 40 to about 60 by weight. Carrier material oxides are normally inert and stable at high temperatures (>1000° C.) and under a range of reducing and oxidizing conditions.

In other embodiments, Washcoat 104 may include oxygen storage materials (OSM), such as cerium, zirconium, lanthanum, yttrium, lanthanides, actinides, and mixtures thereof.

In some embodiments, Washcoat 104 may also include other components such as acid or base solutions or various salts or organic compounds that may be added in order to adjust rheology of the Washcoat 104 slurry and to enhance the adhesion of Washcoat 104 to Substrate 102. Some examples of compounds that can be used to adjust the rheology may include ammonium hydroxide, aluminum hydroxide, acetic acid, citric acid, tetraethyl ammonium hydroxide, other tetralkyl ammonium salts, ammonium acetate, ammonium citrate, glycerol, commercial polymers such as polyethylene glycol, polyvinyl alcohol and other suitable compounds. Preferred solution to enhance binding of Washcoat 104 to Substrate 102 may be tetraethyl ammonium hydroxide.

In other embodiments, other components known to one of ordinary skill in the art may be included in Washcoat 104.

Overcoat Composition

One embodiment of the present disclosure includes an Overcoat 106 within ZPGM Catalyst System 100. Overcoat 106 may include ZPGM transition metal catalysts that may include one or more transition metals, and least one rare earth metal, or mixture thereof that are completely free of platinum group metals. The transition metals may be a single transition metal, or a mixture of transition metals which may include silver, chromium, manganese, iron, cobalt, nickel, copper, niobium, molybdenum, and tungsten. Most suitable ZPGM transition metal may be copper. Preferred rare earth metal may be cerium. The total amount of copper catalyst included in Overcoat 106 may be of about 5% by weight to about 50% by weight of the total catalyst weight, most suitable of about 10% to 16% by weight. Furthermore, the total amount of cerium catalyst included in Overcoat 106 may be of about 5% by weight to about 50% by weight of the total catalyst weight, most suitable of about 12% to 20% by weight. Different copper as well as cerium salts such as nitrate, acetate or chloride may be used as ZPGM catalysts precursors.

In other embodiments, additional ZPGM transition metals may be included in Overcoat 106 composition.

According to the present embodiment, Overcoat 106 may include carrier material oxides. Carrier material oxides may include aluminum oxide, doped aluminum oxide, spinel, delafossite, lyonsite, garnet, perovksite, pyrochlore, doped ceria, fluorite, zirconium oxide, doped zirconia, titanium oxide, tin oxide, silicon dioxide, zeolite, and mixtures thereof. Suitable carrier material oxides for the disclosed Overcoat 106 may include one or more selected from the group consisting of aluminum oxide ($Al_2O_3$) or doped aluminum oxide. The doped aluminum oxide in Overcoat 106 may include one or more selected from the group consisting of lanthanum, yttrium, lanthanides and mixtures thereof. The amount of doped lanthanum in alumina may vary from 0 percent (i.e., pure aluminum oxide) to 10 percent lanthanum oxide by weight; most suitable 4% to 6% lanthanum oxide by weight. Other mixtures of alumina-lanthanum may also be included in other embodiments of Overcoat 106. Carrier material oxide may be present in Overcoat 106 in a ratio of about 40 to about 60 by weight.

In other embodiments, tin aluminum oxide or other suitable metal oxides may be included as carrier material oxide.

Additionally, according to an embodiment, Overcoat 106 may also include OSM. Amount of OSM may be of about 10 to about 90 weight percent, most suitable of about 40 to about 75 weight percent. The weight percent of OSM is on the basis of the oxides. The OSM may include at least one oxide selected from the group consisting of cerium, zirconium, lanthanum, yttrium, lanthanides, actinides, and mixtures thereof. OSM in the present Overcoat 106 may be a mixture of ceria and zirconia; more suitable, a mixture of (1) ceria, zirconia, and lanthanum or (2) ceria, zirconia, neodymium, and praseodymium, and most suitable, a mixture of cerium, zirconium, and neodymium. OSM may be present in Overcoat 106 in a ratio of about 40 to about 60 by weight.

In other embodiments, other components known to one of ordinary skill in the art may be included in Overcoat 106.

In an embodiment, Washcoat 104 may be formed on Substrate 102 by suspending the oxide solids in water to form an aqueous slurry and depositing the aqueous slurry on Substrate 102 as Washcoat 104. Subsequently, in order to form ZPGM Catalyst System 100, Overcoat 106 may be deposited on Washcoat 104.

Method for Preparation of Washcoat and Overcoat

Figure 2:
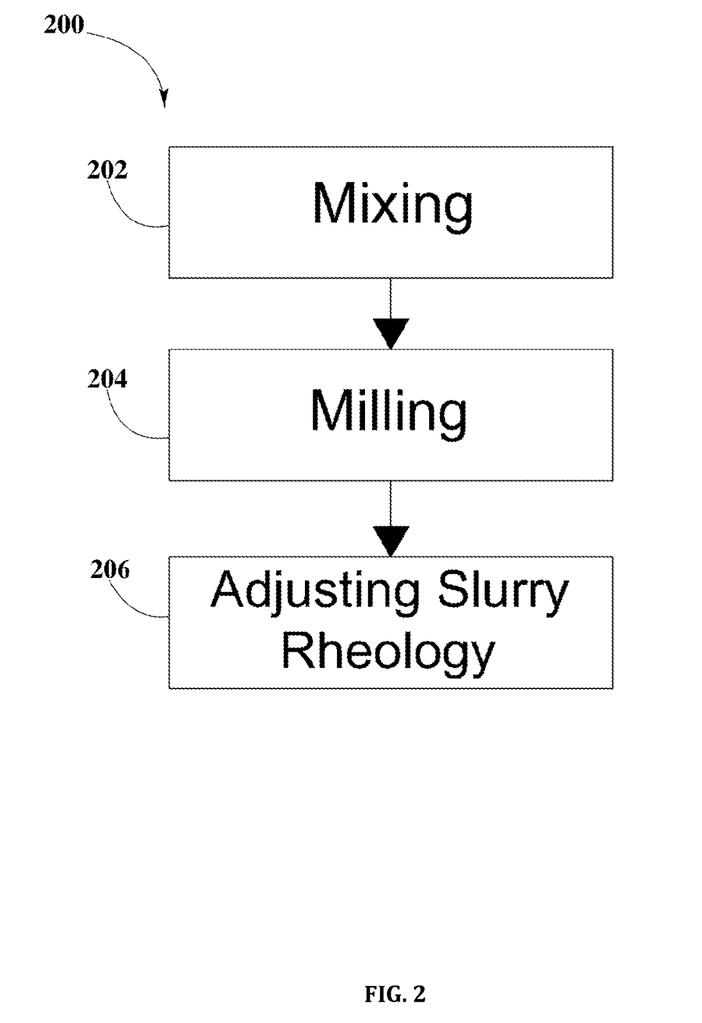
FIG. 2 is a flowchart of method for preparation of a washcoat and an overcoat, according to an embodiment.

FIG. 2 is a flowchart of Method for Preparation 200 of Washcoat 104 and Overcoat 106, according to an embodiment.

According to the present disclosure, Washcoat 104 may be prepared by following Method for Preparation 200. In an embodiment, Method for Preparation 200 may be a "co-milling process" which may begin with Mixing 202 process. In Mixing 202 process, powder forms including Washcoat 104 or Overcoat 106 materials may be mixed with water or any suitable organic solvent. Suitable organic solvents may include ethanol, and Diethyl Ether, Carbon Tetrachloride, Trichloroethylene, among others. Powder forms for Washcoat 104 or Overcoat 106 may include ZPGM transition metal catalyst, and carrier material oxides, previously described in Washcoat 104 composition and Overcoat 106 composition. Subsequently, mixed powder forms may undergo Milling Process 204 in which Washcoat 104 or Overcoat 106 materials may be broken down into smaller particle sizes. Milling Process 204 may take from about 10 minutes to about 10 hours, depending on the batch size, kind of material and particle size desired. In one embodiment of the present disclosure, suitable average particle size (APSs) of the slurry may be of about 4 microns to about 10 microns, in order to get uniform distribution of Washcoat 104 particles or Overcoat 106 particles. Finer particles may have more coat ability and better adhesion to Substrate 102 and enhanced cohesion between Washcoat 104 and Overcoat 106 layers. Milling Process 204 may be achieved by employing any suitable mill such as vertical or horizontal mills. In order to measure exact particle size desired during Milling Process 204, a laser light diffraction equipment may be employed. After Milling Process 204, a catalyst aqueous slurry may be obtained. In order to enhance binding property Washcoat 104 to Substrate 102, aqueous slurry obtained in Milling Process 204 may undergo Adjusting Rheology 206 step. In Adjusting Rheology 206 step, acid or base solutions or various salts or organic compounds may be added to the aqueous slurry. Some examples of compounds that can be used to adjust the rheology may include ammonium hydroxide, aluminum hydroxide, acetic acid, citric acid, tetraethyl ammonium hydroxide, other tetralkyl ammonium salts, ammonium acetate, ammonium citrate, glycerol, commercial polymers such as polyethylene glycol, polyvinyl alcohol and other suitable compounds. All steps included in Method for Preparation 200 may be achieved within room temperature.

Similarly, in an embodiment, Overcoat 106 may be prepared by co-milling method following all steps described in Method for Preparation 200, in which ZPGM transition metal catalysts, OSM and carrier material oxides included in Overcoat 106 materials may be mixed in Mixing 202 process. Subsequently, mixed materials may undergo Milling Process 204 and Adjusting Rheology 206 process in order to obtain Overcoat 106 aqueous slurry.

In other embodiments, Washcoat 104 and Overcoat 106 may be synthesized by any chemical technique such as, co-precipitation, or any other technique known in the art.

Furthermore, the milled Washcoat 104, in the form of aqueous slurry or coating may be deposited on Substrate 102 and subsequently, Washcoat 104 may be treated.

Disclosed Washcoat 104 and Overcoat 106 may exhibit specific surface area (SSAs) of about 80 to 200 m²/g.

Washcoat and Overcoat Deposition Methods and Treatment Methods

According to an embodiment, at least a portion of the catalyst or catalysts of the present disclosure may be placed on Substrate 102 in the form of Washcoat 104 coating. Subsequently, Overcoat 106 may be deposited on Washcoat 104.

According to the present disclosure, the aqueous slurry including Washcoat 104, may be deposited on a suitable Substrate 102 employing vacuum dosing and coating systems.

In some embodiments, other deposition methods may be employed, such as placing, adhering, curing, coating, spraying, dipping, painting, or any known process for coating a film on at least one Substrate 102. If Substrate 102 is a monolithic carrier with parallel flow passages, Washcoat 104 may be formed on the walls of the passages. Gas flowing through the flow passages can contact Washcoat 104 on the walls of the passages as well as materials that are supported on Washcoat 104.

Various amounts of Washcoat 104 of the present disclosure may be coated on Substrate 102, preferably an amount that covers most of, or all of, the surface area of Substrate 102. In an embodiment, about 60 g/L to about 200 g/L of Washcoat 104 may be coated on Substrate 102.

In an embodiment, after depositing Washcoat 104 on Substrate 102. Washcoat 104 may be treated in order to convert metal salts within Washcoat 104 into metal oxides.

In one embodiment Washcoat 104 may be treated by drying and then heating Washcoat 104. In order to dry Washcoat 104, air knife drying systems may be employed. Additionally, Washcoat 104 may be treated by employing firing systems or any suitable treatment system. The treatment may take from about 2 hours to about 6 hours, preferably about 4 hours and at a temperature of about 300° C. to about 700° C., preferably about 550° C.

In one embodiment, after Washcoat 104 has been treated and cooled to about room temperature, Overcoat 106 may be deposited on Washcoat 104 by employing suitable deposition techniques such as vacuum dosing, among others. Overcoat 106 may then be dried and treated employing suitable treating techniques such as firing systems, among others.

In other embodiments, treating of Washcoat 104 may not be required prior to application of Overcoat 106. As such; Overcoat 106, Washcoat 104 and Substrate 102 may be treated for about 2 hours to about 6 hours, preferably about 4 hours and at a temperature of 300° C. to about 700° C., preferably about 550° C.

In some embodiments, an impregnation component may be deposited on Washcoat 104 or/and Overcoat 106. The impregnation component may include one or more selected from the group consisting of a transition metal, alkali and alkaline earth metal, cerium, lanthanum, yttrium, lanthanides, actinides, and mixtures thereof. The impregnation step converts metal salts into metal oxides creating a Washcoat 104 and/or Overcoat 106 including as least one catalyst.

In other embodiments, Washcoat 104 and/or Overcoat 106 may be deposited in different ways; for example, depositing materials without including the catalysts, and then separately depositing at least one impregnation component and heating (this separate deposit is also referred to as an impregnation step).

ZPGM Oxidation Catalyst Systems Performance

Light-Off Test for ZPGM Oxidation Catalyst Systems

Figure 3:
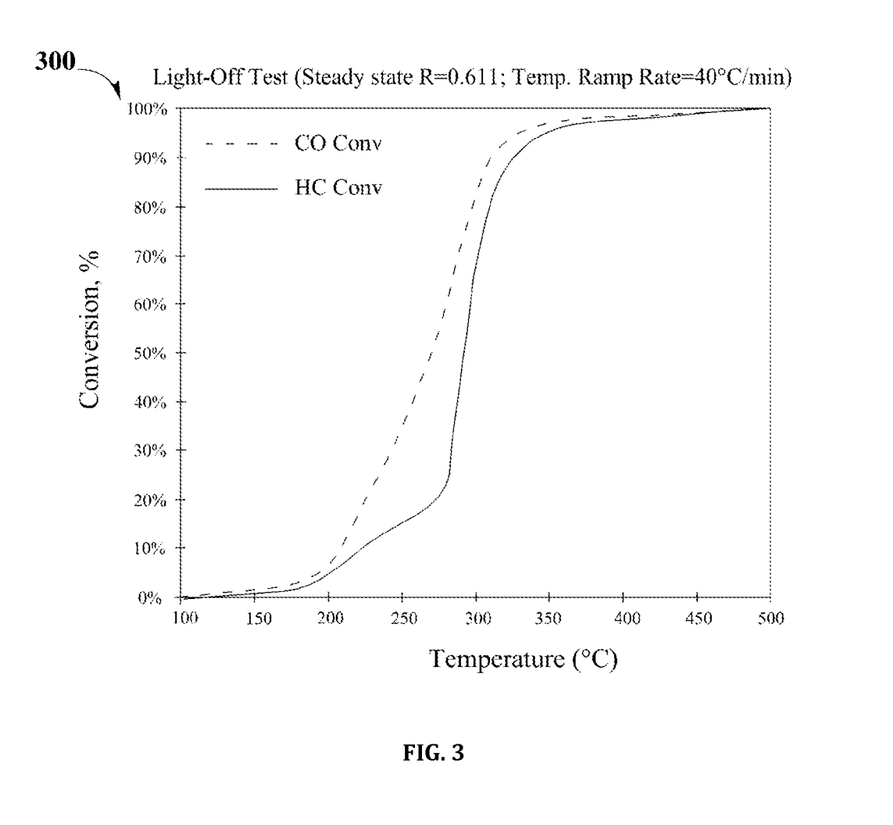
FIG. 3 shows light-off test results of disclosed ZPGM catalyst system with a composition of 5% by weight of Ag in washcoat, 10% by weight of Cu in overcoat and 12% by weight of Ce in overcoat, according to an embodiment.

FIG. 3: shows the Light-off Test Results 300 of an embodiment of disclosed ZPGM Catalyst System 100 formulated with 5% by weight of Ag in Washcoat 104, 10% by weight of Cu in Overcoat 106 and 12% by weight of Ce in Overcoat 106. The light-off test at R=0.316 shows that the catalyst has T50 for CO and HC at about 261° C. and 293° C., respectively.

Light-off test was performed on aged (900° C. for 4 hours) catalysts of the present disclosure. The test was performed by increasing the temperature from about 100° C. to 580° C., at steady state R-value=0.611, and Temperature Ramp Rate=40° C./min. The light-off test may measure the conversions of carbon monoxide and hydrocarbons as a function of the ZPGM Catalyst System 100 temperature. For a specific temperature, a higher conversion signifies a more efficient ZPGM Catalyst System 100. Conversely, for a specific conversion, a lower temperature signifies a more efficient ZPGM Catalyst System 100.

Crystalline Size and Dispersion of ZPGM Catalyst Systems

Figure 4:
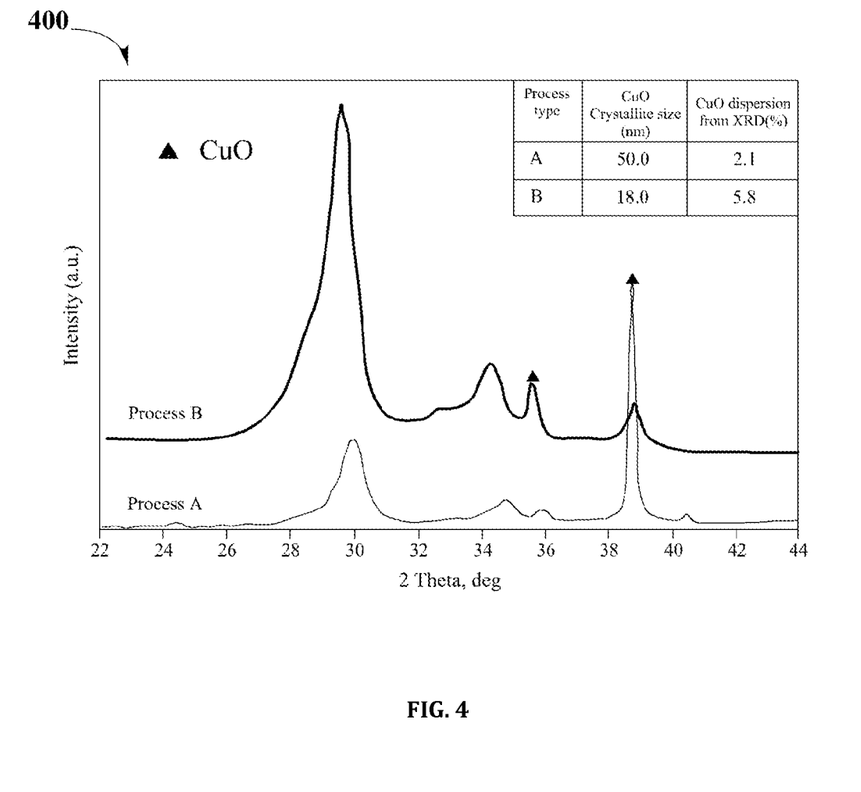
FIG. 4 shows X-ray diffraction (XRD) patterns of fresh overcoat material of ZPGM catalyst system, where overcoat processing method is different. "Process A" is the catalyst where overcoat is prepared by the co-precipitation method and "process B" is the catalyst where the overcoat is prepared by the co-milling method.

FIG. 4 shows the X-Ray Diffraction (XRD) Patterns 400 of fresh Overcoat 106 material of ZPGM Catalyst System 100, where Overcoat 106 processing method is different. "Process A" is the catalyst where Overcoat 106 is prepared by the co-precipitation method and "process B" is the catalyst where the Overcoat 106 is prepared by the co-milling method. The X-Ray Diffraction (XRD) Patterns 400 analysis is conducted to determine the crystalline phases present in Overcoat 106 materials and to determine the crystallite size of copper oxide. The X-Ray Diffraction (XRD) Patterns 400 are measured on a Rigaku® powder diffractometer (MiniFlex™) using Cu Kα radiation in the 2-theta range of 20-90° with a step size of 0.02° and a dwell time of 1 s. The tube voltage and current were set at 40 kV and 30 mA, respectively. The resulting diffraction patterns are analyzed using the International Centre for Diffraction Data (ICDD) database.

As shown in FIG. 4 CuO crystalline size (filled diamonds) is larger when catalysts are prepared employing the co-precipitation method as evidence by the sharper peak of CuO at about 2-theta=38.7 degree. The CuO crystallite size was calculated about 50 and 18 nanometers when prepared by employing co-precipitation method and co-milling method, respectively. The copper dispersion was then calculated about 2.1% and 5.8% for co-precipitation method and co-milling method, respectively. The table within FIG. 4 presents the CuO crystallite size and dispersion, showing that a better dispersion of CuO and smaller CuO particles may be obtained when employing co-milling method to prepare copper catalysts within Overcoat 106.

EXAMPLES

Example #1 is an embodiment of ZPGM Catalyst System 100 that additionally to the Substrate 102, includes the following Washcoat 104 and Overcoat 106 compositions:

| LAYER | ZPGM | OSM | CARRIER MATERIAL OXIDES |
|---|---|---|---|
| WASHCOAT | Ag | Ce—Zr | Alumina |
| OVERCOAT | — | — | — |

Figure 5:
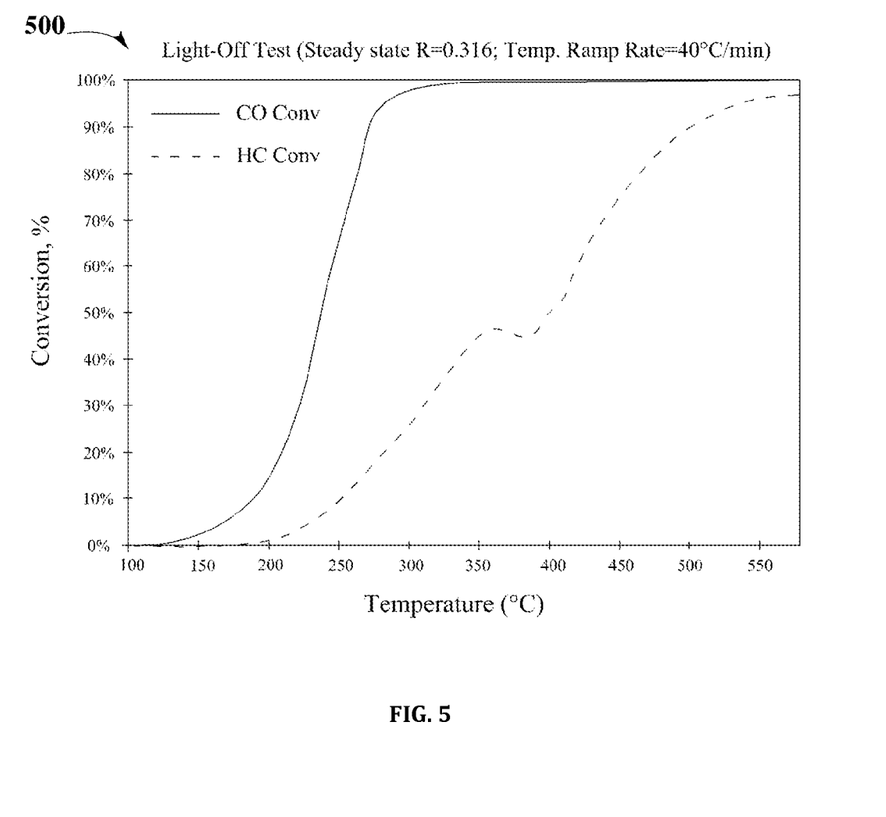
FIG. 5 s for ZPGM catalyst system including example composition, formulated with 5% by weight of Ag, with only washcoat, according to an embodiment.

FIG. 5 shows results for ZPGM catalyst system including example 1 composition 500, formulated with 1-10% by weight of Ag, with only Washcoat 104. The light-off test at R=0.316 shows that ZPGM Catalyst System 100 has T50 for CO at 237° C. and a T50 for HC at 402° C. There is no measured NO conversion up to 580° C. This result shows ZPGM Catalyst System 100 has great oxidation activity under lean condition.

Example #2 is an embodiment of ZPGM Catalyst System 100 that additionally to the Substrate 102, includes the following Washcoat 104 and Overcoat 106 compositions:

| LAYER | ZPGM | OSM | CARRIER MATERIAL OXIDES |
|---|---|---|---|
| WASHCOAT | — | Ce—Zr | Lanthanum doped Alumina |
| OVERCOAT | Cu—Ce | Ce—Zr—Nd—Pr | Lanthanum doped Alumina |

Figure 6:
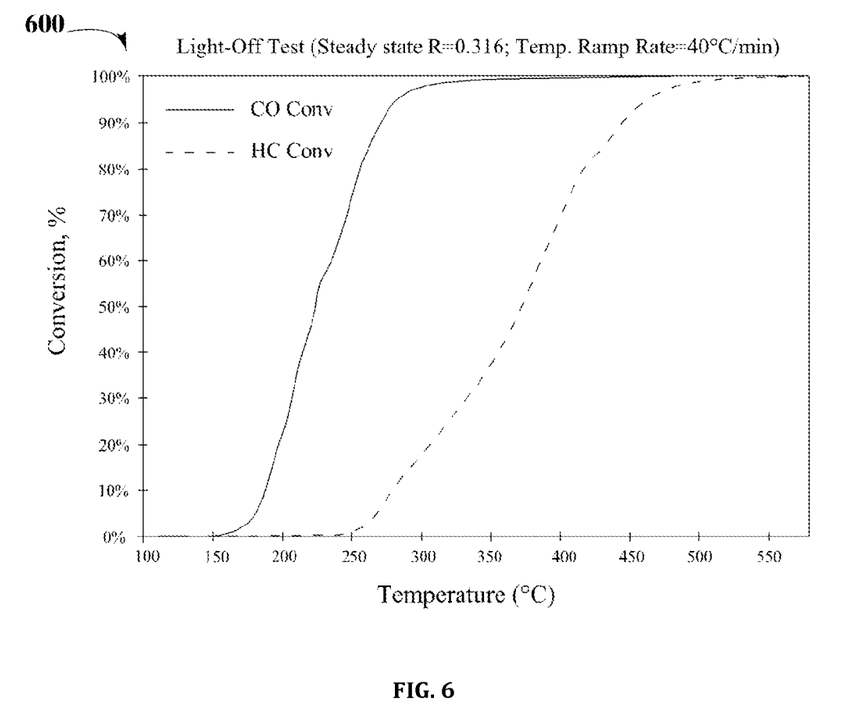
FIG. 6 shows results for ZPGM catalyst system including example 2 composition, formulated with 10% by weight of Cu and 12% by weight of Ce in overcoat with no transition metal in washcoat, according to an embodiment.

FIG. 6 shows results for ZPGM catalyst system including example 2 composition 600, formulated with 5-20% by weight of Cu and 5-15% by weight of Ce in Overcoat 106 with no transition metal in Washcoat 104. The light-off test at R=0.316 shows that ZPGM Catalyst System 100 has T50 for CO at 222° C. and a T50 for HC at 372° C. There is no measured NO conversion up to 580° C. The different shape of light-off curve confirms the oxidation reaction will be occurred base on different reaction mechanisms on catalysts within ZPGM Catalyst System 100.

Example #3 is an embodiment of ZPGM Catalyst System 100 that additionally to the Substrate 102, includes the following Washcoat 104 and Overcoat 106 compositions:

| LAYER | ZPGM | OSM | CARRIER MATERIAL OXIDES |
|---|---|---|---|
| WASHCOAT | Ag | Ce—Zr | Alumina |
| OVERCOAT | Cu—Ce | Ce—Zr—Nd—Pr | Lanthanum doped Alumina |

Figure 7:
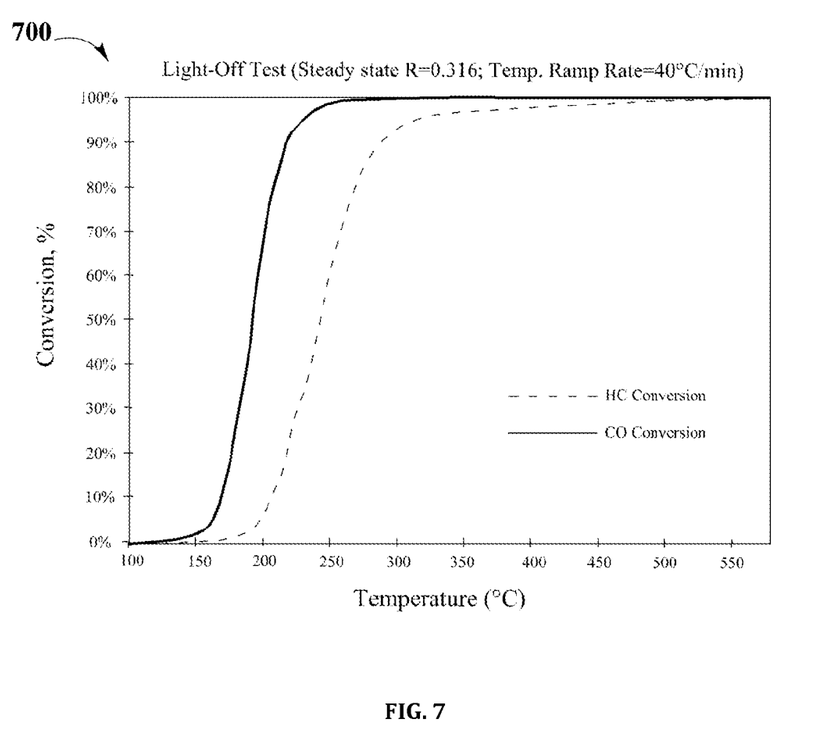
FIG. 7 shows results for ZPGM catalyst system including example 3 composition, formulated with 5% by weight of Ag in washcoat, 10% by weight of Cu and 12% by weight of Ce in overcoat, according to an embodiment.

FIG. 7 shows results for ZPGM catalyst system including example 3 composition 700, formulated with 1-10% by weight of Ag in Washcoat 104, 5-20% by weight of Cu and 5-15% by weight of Ce in Overcoat 106. The light-off test at R=0.316 shows that ZPGM Catalyst System 100 has T50 for CO and HC of about 192° C. and 242° C., respectively. There is no measured NO conversion up to 580° C.

Example #4 is an embodiment of ZPGM Catalyst System 100 that additionally to Substrate 102, includes the following Washcoat 104 and Overcoat 106 compositions:

| LAYER | ZPGM | OSM | CARRIER MATERIAL OXIDES |
|---|---|---|---|
| WASHCOAT | — | Ce—Zr | Lanthanum doped Alumina |
| OVERCOAT | Ag—Cu—Ce | Ce—Zr—Nd—Pr | Lanthanum doped Alumina |

Figure 8:
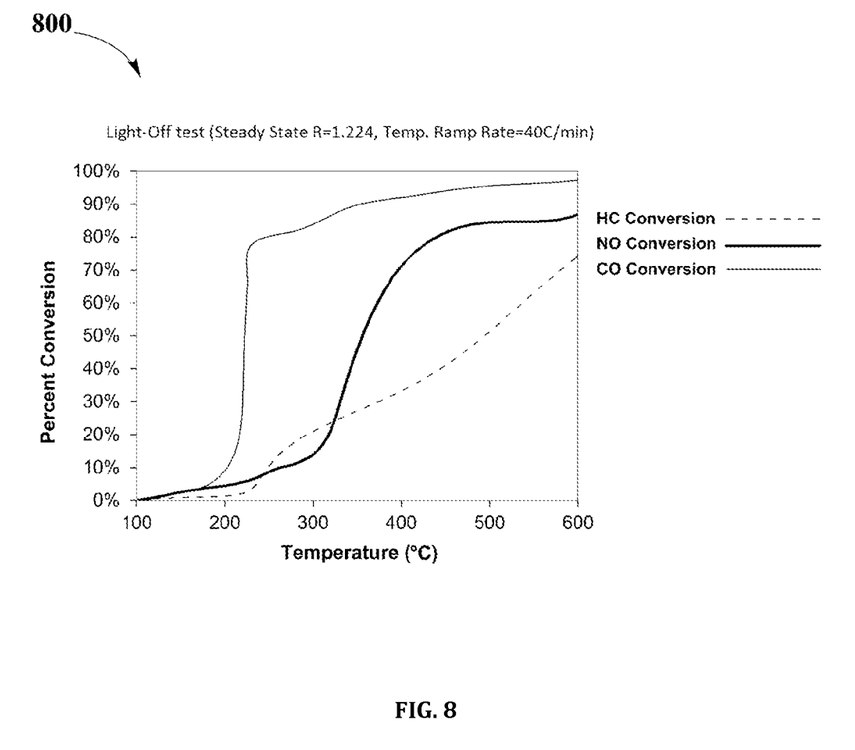
FIG. 8 shows light-off test results for ZPGM catalyst system including example 4 composition, formulated with 5% by weight of Ag in and 10% by weight of Cu in overcoat, according to an embodiment.

FIG. 8 shows light-off test results for ZPGM catalyst system including example 4 composition 800, formulated with 1-10% by weight of Ag in and 5-20% by weight of Cu in Overcoat 106. The light-off test under rich condition at R=1.224 shows that ZPGM Catalyst System 100 has T50 for HC at about 475° C., a T50 for CO at about 210° C. and T50 for $NO_x$ at about 330° C.

While various aspects and embodiments have been disclosed herein, other aspects and embodiments may be contemplated. The various aspects and embodiments disclosed herein are for purposes of illustration and are not intended to be limiting, with the true scope and spirit being indicated by the following claims.

I claim:

1. A method of preparing an oxidation catalyst system, comprising:
    mixing a powder material containing at least one of a zero platinum group metal (ZPGM) catalyst, a transition metal catalyst and a carrier material oxide with a solvent to form a ZPGM catalyst slurry; and
    applying the ZPGM catalyst slurry to a substrate as at least one of a washcoat and an overcoat applied over the washcoat, wherein at least one of the washcoat and the overcoat is synthesized by co-precipitation;
    wherein an average particle size of the powder is in the range of about 4 microns to about 10 microns.

2. The method of claim 1, wherein the solvent is one of water and an organic solvent.

3. The method of claim 2, wherein the organic solvent includes at least one selected from the group consisting of ethanol, diethyl ether, carbon tetrachloride, and trichloroethylene.

4. The method of claim 1, further comprising forming the powder by milling pieces of at least one of the ZPGM transition metal catalyst and the carrier material oxide metal.

5. The method of claim 1, wherein the ZPGM catalyst slurry contains at least one oxygen storage material (OSM).

6. The method of claim 5, wherein the OSM is included in the powder material mixed with the solvent.

7. The method of claim 1, wherein the method is performed in an environment having a temperature in the range of about 18° C. to about 24° C.

8. The method of claim 5, wherein the OSM includes at least one of cerium, zirconium, lanthanum, yttrium, a lanthanide, and an actinide.

9. The method of claim 1, wherein at least one of the washcoat and the overcoat has a specific surface area of about 80 $m^2$/g to about 200 $m^2$/g.

10. The method of claim 1, further comprising forming the washcoat on the walls of the parallel flow passages of a substrate, whereby gas flowing through the flow passages contacts the washcoat on the walls of the passages.

11. The method of claim 1, further comprising, after depositing the wash coat on the substrate:
    converting metal salts within the deposited washcoat into metal oxides by heating the deposited washcoat.

12. The method of claim 11, wherein the heating comprises exposure to a temperature of about 300° C. to about 700° C. for between about 2 hours to about 6 hours.

13. The method of claim 11, wherein the heating comprises exposure to a temperature of about 550° C. for about 4 hours.

14. The method of claim 11, further comprising: cooling the treated washcoat to a range of about 18° C. to about 24° C. and depositing the overcoat to the washcoat.

15. The method of claim 1, further comprising applying an impregnation component to at least one of the washcoat and the overcoat.

16. The method of claim 15, wherein the impregnation component includes at least one of a transition metal, an alkali, an alkaline earth metal, cerium, lanthanum, yttrium, a lanthanide, and an actinide.

17. The method of claim 16, wherein the impregnation component converts metal salts into metal oxides.

18. The method of claim 17, wherein at least one of the washcoat and the overcoat contains at least one catalyst.

19. The method of claim 16, wherein the impregnation component includes at least one impregnation step comprising:
depositing on one of the washcoat and the overcoat at least one impregnation component; and
heating the deposited impregnation component.

20. The method of claim 1, wherein the washcoat comprises silver.

21. The method of claim 1, wherein the overcoat comprises copper.

22. The method of claim 1, wherein the overcoat comprises cerium.

23. The method of claim 1, wherein the applying the ZPGM catalyst slurry to the substrate comprises vacuum dosing.

* * * * *